April 7, 1959  F. S. DICKINSON, JR  2,880,722
COUPLING
Filed Oct. 19, 1953
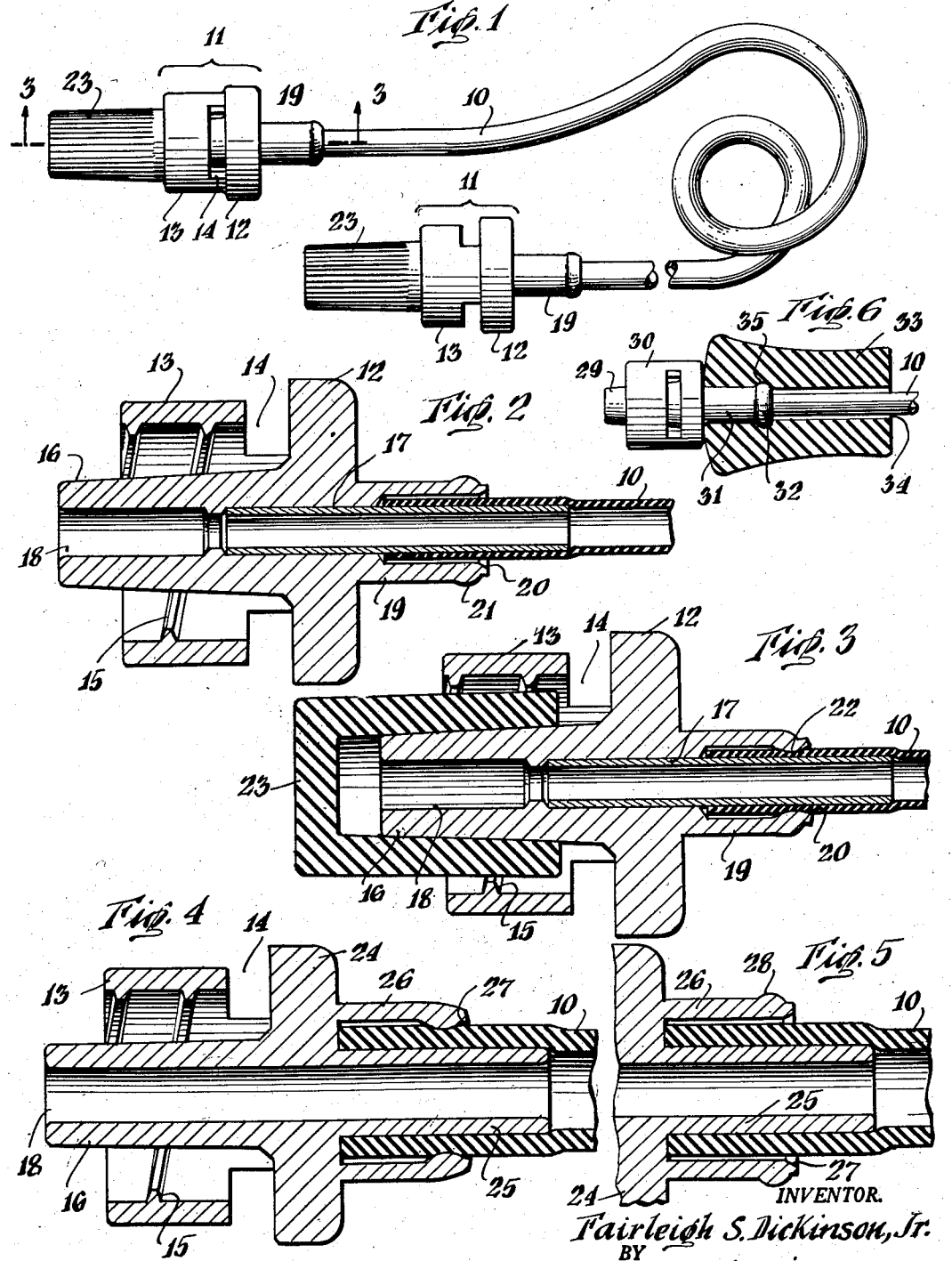
INVENTOR.
Fairleigh S. Dickinson, Jr.
BY Kane, Dalsimer and Kane
ATTORNEYS

United States Patent Office 2,880,722
Patented Apr. 7, 1959

2,880,722

COUPLING

Fairleigh S. Dickinson, Jr., Ridgewood, N.J., assignor to Becton, Dickinson and Company, Rutherford, N.J., a corporation of New Jersey Application October 19, 1953, Serial No. 386,931

1 Claim. (Cl. 128—214)

This invention relates to a structurally and functionally improved assembly for use in numerous different associations but primarily intended to be employed in connection with the donating and transferring of blood and other liquids.

It is an object of the invention to furnish an assembly of this nature and by means of which needles of the hypodermic type may be readily fixedly connected with or detached from a length of tubing. Accordingly, it will be feasible to easily clean and sterilize the separate components of an apparatus and thereupon to group the parts together for use as desired. So grouped they will provide one unitary assembly, the component parts of which will not become accidentally detached from each other during storage or use. Thereafter certain of these parts may be recleaned and sterilized after being detached from other units, which latter are conveniently discarded.

A further object is that of furnishing a structure in which the fittings for detachably coupling the hollow needles will be secured against all probability of accidental or deliberate detachment from the length of necessary tubing.

Still another object is that of providing an assembly which will include relatively few parts, each individually simple and rugged in construction, such parts being capable of economical manufacture by quantity production methods and being likewise capable of connection with each other by the same methods.

With these and other objects in mind, reference is had to the attached sheet of drawings illustrating practical embodiments of the invention and in which:

Fig. 1 is a side elevation of a complete assembly;

Fig. 2 is an enlarged sectional side view of the fitting and a length of tubing prior to permanently coupling these parts;

Fig. 3 is a sectional side view taken along the line 3—3 in the direction of the arrows as indicated in Fig. 1;

Fig. 4 is a view similar to Fig. 3 but showing an alternative structure;

Fig. 5 is a view similar to Fig. 2 but illustrating the structure shown in Fig. 4; and Fig. 6 is a sectional view showing a separate actuator forming a part of the assembly.

In these views the numeral 10 indicates a length of tubing suitable for use in connection with blood donor sets as well as for the transfer of blood and other liquids. This tubing is conveniently formed of plastic material capable of ready sterilization and should be fully flexible without presenting any danger of "kinking." Also the tubing should preferably be transparent or translucent so that any liquid contained within the same may be visible from the exterior.

As will be understood in connection with the donation and transfer of blood and similar liquids, hollow needles of the hypodermic type should be capable of ready association with the ends of the tubing. At the same time such association is desirably not of a permanent nature. Accordingly, the needles which are used to pierce the tissues and extend into the vein as well as to pierce the diaphragm portions of stoppers may be used, cleaned, sterilized and re-used rather than being discarded with the tubing. With this thought in mind, the present invention provides an assembly in which the end or ends of the tubing mount fittings such that the needles may readily be coupled with or detached from the tubing. These fittings have been generally shown in Fig. 1 and indicated by the reference numeral 11. As in Figs. 2 and 3, they may each include a head 12 which supports a mounting ring 13 integral therewith and which latter has its inner end defined by slots 14. The diameter of head 12 is greater than that of ring 13 to thus furnish a manipulating portion extending beyond the same. The inner face of ring 13 preferably provides a mounting thread 15 and this ring encircles a stem or tip 16 which is desirably tapered so as to cooperate with and sealingly engage the hub bore surfaces of a needle (not shown). In accordance with conventional technique, flange parts of this hub may also engage with threads 15 so that upon the parts being relatively rotated, the needle will, in effect, be locked in fluid-tight relationship with and become a fixed portion of the fitting. The head of the latter may be employed to manipulate the needle for piercing and other purposes.

As in Fig. 2, the tubing or conduit 10 is secured to the fitting by disposing within the rear bore portion of the latter a tube 17 which may have a force fit with that bore. Conduit 10 is ensleeved over tube section 17 which projects to the rear of head 12. The normal bore diameter of the conduit should be substantially equal to the bore diameter of tube 17. The latter will, of course, align with the bore 18 at the outer end of the fitting so that communication will be established between the lumen of the needle and the tubing.

Forming an integral part of head 12 and extending rearwardly of the same is a collar 19. The length of the latter is less than that of tube 17. It is concentrically disposed with respect to and spaced from tube 17 a distance such that the end portion of conduit 10 may readily be disposed between the tube and collar as shown in Fig. 2. Adjacent its inner edge this collar is preferably formed with a flared surface 20 and a bead or projecting portion 21 may be provided on its outer face at a point short of its edge.

Tube 17, in addition to its force fit with head 12, may be retained against all probability of accidental displacement by employing, for example, stake riveting technique on the outer face of head 12. This will involve the application of pressure (preferably by a sharp blow or blows) to the surface of head 12 at points adjacent the canulla 17. Accordingly, the metal of the head will "crowd" against the tube to lock these parts against movement similarly to the manner in which a hypodermic needle may be locked against movement with respect to its hub portion or similar element. Also, by means of a riveting die or in any other suitable manner, pressure may be applied to collar 19 adjacent its outer end. So applied and as shown in Fig. 3, the collar adjacent this outer end will be caused to be contracted. Such contraction will be evidenced by bead surface 21 being flattened or obliterated. Therefore, as indicated at 22, conduit 10 will be compressed or pinched between the collar and tube. Accordingly it will be secured against withdrawal over the tube and within the collar.

Therefore, no detachment of these parts will occur. As shown in Figs. 1 and 3, caps 23 may be employed to enclose the tip or stem 16 and thus protect the latter against contamination. With the cap removed, a sterilized needle may readily be coupled to the fitting in the usual manner. This will involve a connection such as a slip fit between the needle hub and stem 16; friction being depended upon to secure the parts against detachment. Otherwise, it will additionally involve an engagement of the thread or threads 15 by the projecting corner portions of the needle hub. That needle will remain in mounted position until it is deliberately detached from the fitting by the operator.

In Figs. 4 and 5, a head portion has been indicated at 24. The needle contacting and mounting parts are substantially identical with those heretofore described. However, the tube portion 25, instead of being a separate element as is tube 17, is preferably integral with head 24. It is also encircled by a collar 26 which, similar to collar 19, is provided with a beveled surface 27 adjacent its inner edge and preferably a bead 28 upon its outer face. As is apparent from a consideration of Fig. 5, conduit 10 may readily be ensleeved over tube 25 to a point where its edge bears against the adjacent head surface.

Thereupon, by using a riveting die or other constricting force, collar 26 is contracted adjacent its outer edge. Such contraction brings surface 27 to a point where it lies substantially parallel to the axis of the assembly in common with the results which follow from a restriction of collar 19. Therefore conduit 10 is compressed against tube 25 and such compression results in the parts being coupled against any probability of accidental detachment from each other as in Fig. 4.

Finally and as shown in Fig. 6, the enlarged head portion 12 of the fitting may be eliminated. Under these circumstances, that unit may simply include a stem or tip 29 and a body 30 corresponding in general design and function to the parts heretofore described under numbers 12-16 inclusive. Forming a fixed part of the fitting is a rearwardly extending tube portion as earlier described in connection with Figs. 2 to 5 inclusive. This portion is encircled by a collar 31 having an annular bead 32; a conduit or tube 10 is attached also in the manner aforedescribed. To provide an actuator by means of which the resultant assembly may be conveniently manipulated, a plug or body 33 of plastic or other suitable material is ensleeved over the parts as shown in Fig. 6; this being possible due to the bore portion 34 which is formed in plug 33. The stem or collar 31 will, under these circumstances, project into that bore and its projecting bead or enlargement 32 will project radially into a recess 35 in the bore face should such a recess be necessary due to the relatively rigid nature of the material which provides plug 33. In any event it will be understood that the operator, by simply encircling and gripping plug 33 with his fingers, will have no difficulty in manipulating the fitting and, for example, forcing a needle attached thereto through a seal.

Thus, among others, the several objects of the invention as specifically aforenoted are achieved. Obviously, numerous changes in construction and rearrangements of the parts might be resorted to without departing from the spirit of the invention as defined by the claim.

I claim:

An assembly of the character described including in combination a head, a tip and mounting ring extending from one side of said head, a tube and collar extending from the other side of said head, said collar encircling said tube in spaced relationship to and terminating short of the free end of the latter, said ring encircling and being spaced from said tip and the diameter of said head being greater than said collar and ring to provide an intermediate manipulating portion for said assembly.

References Cited in the file of this patent

UNITED STATES PATENTS

| | | |
|---|---|---|
| 517,180 | Wilson | Mar. 27, 1894 |
| 1,965,151 | Mueller | July 3, 1934 |
| 2,076,121 | Dickinson | Apr. 6, 1937 |
| 2,452,643 | Fields | Nov. 2, 1948 |
| 2,525,616 | Peeps | Oct. 10, 1950 |
| 2,570,421 | Baldwin | Oct. 9, 1951 |
| 2,682,874 | Hickey | July 6, 1954 |
| 2,767,710 | Blackman | Oct. 23, 1956 |
| 2,792,833 | Magash et al. | May 21, 1957 |

FOREIGN PATENTS

| | | |
|---|---|---|
| 478,459 | Canada | Nov. 13, 1951 |